United States Patent [19]

Krier et al.

[11] Patent Number: 5,042,541

[45] Date of Patent: Aug. 27, 1991

[54] INFLATION NOZZLE FOR CARGO AIR BAG

[75] Inventors: Martin Krier; Albert S. Burroughs, both of Cincinnati, Ohio

[73] Assignee: Shippers Paper Products Company, Loveland, Ohio

[21] Appl. No.: 533,481

[22] Filed: Jun. 5, 1990

[51] Int. Cl.$^5$ .............................................. B65B 31/06
[52] U.S. Cl. .................................. 141/313; 141/386; 141/346; 141/349; 251/149.6
[58] Field of Search ............... 141/114, 313, 346, 348, 141/349, 350, 382, 383, 386, 166, 312; 251/149.6, 149, 149.1; 285/38, 308, 317; 222/511

[56] References Cited

U.S. PATENT DOCUMENTS

| 201,212 | 3/1878 | Wiesebrock | 141/386 |
| 1,974,476 | 9/1934 | Wahl | 285/317 |
| 2,003,039 | 5/1935 | Crowley | 285/317 |
| 3,385,329 | 5/1968 | Kellermeier | 141/383 |
| 3,567,175 | 3/1971 | Sciuto | 251/149.6 |
| 4,146,069 | 3/1979 | Angarola et al. | 141/349 |

FOREIGN PATENT DOCUMENTS 1065176  4/1967  United Kingdom ................ 141/386

*Primary Examiner*—Henry J. Recla
*Assistant Examiner*—Scott Flanders
*Attorney, Agent, or Firm*—Wood, Herron & Evans

[57] ABSTRACT

An inflation nozzle for inflating cargo air bags having a main body through which compressed air flows to an outlet in a nozzle tip and a handle pivoted to the main body carrying at its end adjacent the nozzle tip a spring-loaded closure for closing off the outlet when the inflation nozzle is out of engagement with the cargo air bag valve. The body and handle are spring loaded whereby the handle can be squeezed and slid into engagement with the air bag valve; and, on release, the nozzle tip protrudes into the air valve opening it and completing locking of the nozzle to the valve.

7 Claims, 2 Drawing Sheets

INFLATION NOZZLE FOR CARGO AIR BAG

BACKGROUND OF THE INVENTION

This invention relates to an inflation nozzle for inflating an article with a gas under pressure and, more particularly, to an inflation nozzle for inflating cargo air bags with compressed air.

Cargo air bags are known to the art as a simple, low-cost means of bracing rail cars, trailers, and overseas containers for securing cargo for shipment. Air bags typically comprise an inflatable bladder which is secured inside of a paper bag or envelope. The bags are of such a size that they can be inserted into voids between spaced loads or between the load and the side or end walls of a container such as a railroad car or trailer and then inflated to expand and secure the load against movement during transit. To this end, the air bag is provided with an inflation valve permitting the bag to be inflated in place with a gas under pressure, typically compressed air, to a desired inflation pressure at which the bag is expanded to exert an outward pressure to force the load against side or end walls, or against bulkheads, to restrain the load from moving.

One such inflation valve now in use includes a plastic valve having a tubular valve body to which a flange is attached. The flange is welded to a plastic bladder inside the paper bag to form an airtight seal and the valve body extends out of the bag where it can be grasped by a suitable air inflation fixture. The valve includes a valve stem mounted in the tubular valve body movable between a valve open position and valve closed position sealing the bladder closed. The valve stem is spring loaded so that it is biased to the valve closed position until contacted by the air inflation device which pushes the valve stem inwardly to open the valve body for the flow of compressed air into the bladder.

SUMMARY OF THE INVENTION

It is among the principal objects of this invention to provide an improved inflation nozzle for air bags of the type described which is easily inserted and removed from the air bag valve, which when inserted in the valve positively locks to the valve and opens the valve for the flow of compressed air into the bag, and which when disengaged from the valve automatically covers the nozzle outlet to prevent the unintentional flow of air out of the nozzle. In a presently preferred form of the invention, the inflation nozzle includes a main body portion having an air inlet end, an air outlet end, and a passageway therebetween for conducting gas, such as air under pressure; a nozzle tip at the outlet end of the main body portion, and a handle pivoted to the body and spring loaded with respect to the body. The handle includes a recess with side guides which is adapted to engage a mating edge of the tubular valve body of the air bag valve when the inflation nozzle is placed on the valve. In this position, the nozzle tip protrudes down into the through opening in the valve body depressing the valve stem against the biasing spring causing the valve to open for the flow of compressed air therethrough to inflate the bladder. The spring loading of the handle to the body of the inflation nozzle acts to positively clamp the inflation nozzle on the valve body.

The nozzle further includes a closure which is mounted for sliding moving in the handle and which is spring biased to a forward or nozzle-closed position wherein the closure covers the outlet of the nozzle tip. That is, with the inflation nozzle removed from the air bag valve, the closure is spring loaded forwardly to automatically close off the outlet to the nozzle tip to prevent the unintentional flow of compressed air therethrough. However, when the nozzle is grasped by the operator and squeezed to pivot the handle on the nozzle body and move the handle away from the nozzle tip; and, when the inflation nozzle is slid on the air bag valve, the receipt of the valve body in the handle recess compresses the closure spring and causes the closure to retract thus opening the nozzle tip for inflation. When the handle is released, the nozzle tip is pressed into the valve body engaging the valve stem, opening the valve, and completing the clamping of the inflation nozzle on the valve.

The inflation nozzle of the present invention is easily operated and has the advantages that it may be quickly slidingly engaged and disengaged from the air bag valve merely by the squeeze of an operator's hand; and, in the engaged position, firmly and positively clamps on the air bag valve whereby the air bag may be inflated without the operator holding the inflation nozzle to the bag.

DETAILED DESCRIPTION OF THE INVENTION

Figures 1, 2:
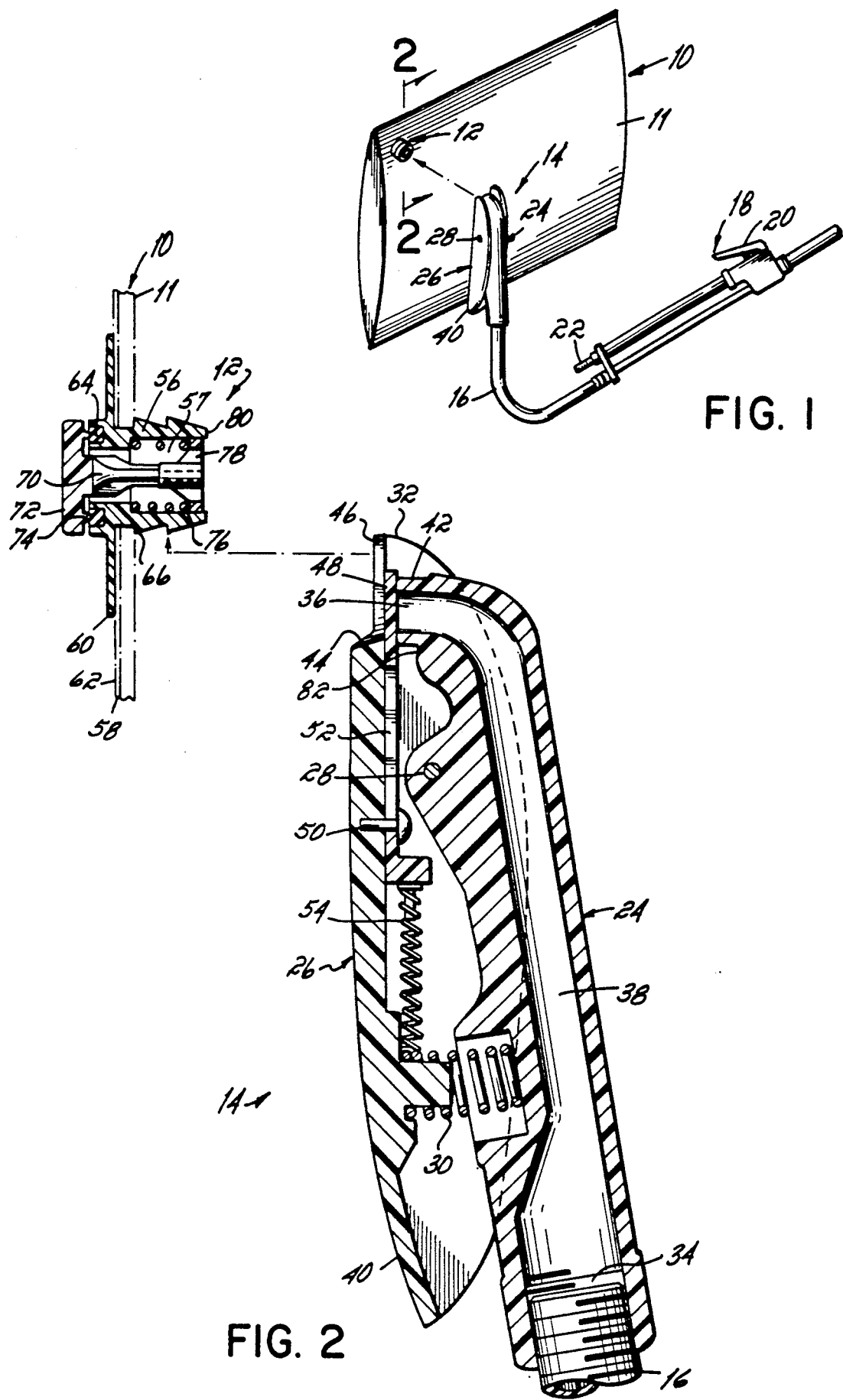
FIG. 1 is a schematic illustration of a air bag and the air inflation nozzle of the present invention for inflating the bag.
FIG. 2 is a cross-sectional view of the air bag inflation nozzle of the present invention in its position removed from the air bag and of the air valve located in the air bag in the valve closed position taken along line 2—2 of FIG. 1.

Referring to FIG. 1, a typical cargo air bag 10 is rectangular in configuration and includes a plastic bladder (not shown) sealed inside a paper bag 11 with an inflation valve 12 extending through the wall thereof. A known cargo air bag is shown in U.S. Pat. No. 4,591,519, assigned to the assignee of the present invention, and its disclosure is incorporated herein by reference. The air inflation nozzle 14 of the present invention is connected to the end of a hose 16 which communicates at its opposite end with a source (not shown) of gas under pressure, for example, most commonly an air compressor. The nozzle 14 is adapted to engage the air valve 12 by manipulation of an operator to inflate the air bag and to secure the air bag in position to brace a load. A hand operated on/off valve 18 may be placed upstream of the nozzle 14 and typically includes a lever 20 actuated valve which opens and closes the hose 16 for the passage and shut off of compressed air. A built-in pressure gauge 22 may also be used whereby the operator can quickly and easily read the inflation pressure. Heavyweight air bags typically are inflated to a pressure in the range of 3 to 8 psi, and lightweight air bags typically are inflated to a pressure of 1 to 3 psi. The source of compressed air, e.g., an air compressor, is typically operated in the range of 50 to 100 psi.

Referring now to FIG. 2, the inflation nozzle 14 includes a main body portion 24 and a handle 26 pivoted about a pin 28 to the main body portion 24. A spring 30 mounted between the body 24 and the handle 26 pivots the handle 26 to a position wherein the forward end 32 of the handle rotates toward the body 24. The body 24 includes an air inlet 34 at one end, an air outlet 36 at the other end, and a passageway 38 through the body 24 connecting the air inlet 34 to the air outlet 36. The air inlet 34 may be internally threaded to receive a male fitting on the air hose 16 although it will be recognized that it could as well be externally threaded to receive a female fitting. The body 24 and handle 26 are of a generally of an extended length whereby the body portion between the pivot 28 and the air inlet 34 may be received in the palm of an operator's hand, and the handle portion between the pivot 28 and its rearward end 40 may be received in the operator's fingers whereby the operator by a squeezing motion may compress the spring 30 to move the forward end 32 of the handle 26 away from the body 24 and the air outlet 36. On release of the operator's hand pressure, the spring 30 rotates the handle 26 about the pivot pin 28 to rotate the forward end 32 of the handle 26 toward the air outlet 36 of the body 24.

Figure 4:
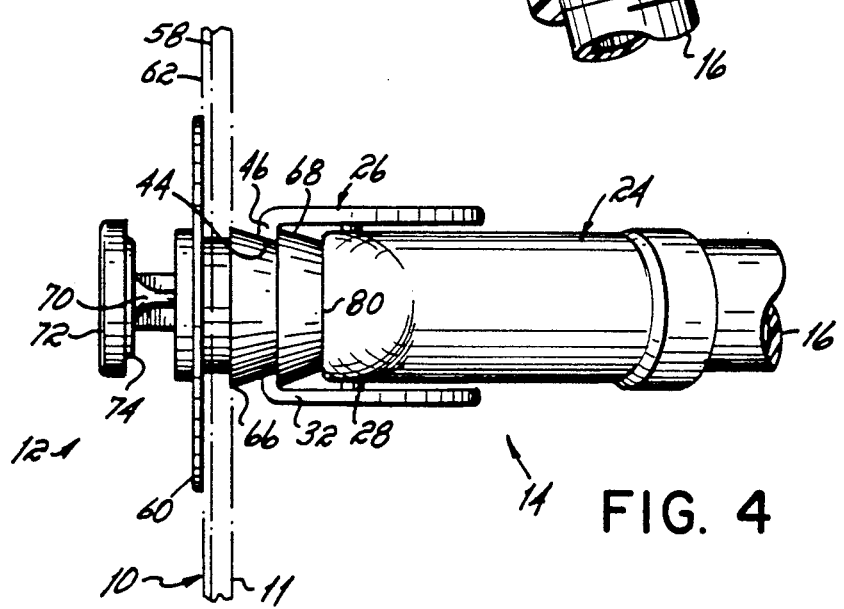
FIG. 4 is an end view of the inflation nozzle and air valve in the engaged position taken along line 4—4 of FIG. 3.

A tubular nozzle tip 42 integral with the body 24 is located at the forward end of the body and forms the air outlet 36 of the body 24. The handle 26 at its forward end 32 includes a recess 44 which is bounded on either side by side guides 46 (FIGS. 2 and 4). A closure 48 slides over the recess 44. The closure 48 is mounted in the handle 26 by a pin 50 and slot 52 connection and is spring loaded by a spring 54 toward the forward end 32 of the handle 26. With no external force of the closure 48, the pressure of the spring 54 causes the closure 48 to slide to the forward end 32 of the handle covering the air outlet 36. The force of spring 30 causes the nozzle tip 42 and closure 48 to tightly engage. This prevents any accidental ejection of compressed air when the inflation nozzle 14 is removed from the air bag inflation valve 12.

Referring further to FIG. 2, the air bag inflation valve 12 includes a tubular valve body 56 which extends through the wall 58 of the air bag 10. The valve body 56 has an opening 57 extending therethrough. The valve body 56 further includes an annular flange 60 located inside the air bag 10 which is sealed, e.g., by ultrasonic welding, to a plastic bladder 62 interiorly of the air bag 10 to form a sealed connection therewith.

An annular valve seat 64, which may be formed of an elastomeric seating material, is located at the end of the valve body 56 inside the bladder 62. The valve body 56 extends out of the air bag 10 and includes a first annular edge 66 which engages the outer surface of the air bag 10 and cooperates with the flange 60 to secure the valve 12 in the wall 58 of the air bag 10. A second annular edge 68 of the valve body 56 is received on the side guides 46 of the handle 26 when the nozzle 14 is engaged with the valve 12, as described below.

The air bag valve 12 further includes a valve stem 70 having an annular closure plate 72 in the interior of the bladder 62. The closure plate 72 includes an annular ridge 74 which seats on the annular seat member 64. An internal spring 76 biases the valve stem 70 to a normally closed position wherein the annular ridge 74 seats in the elastomeric seat 64 to seal the valve 12 closed. The valve stem 70 is movable in the through opening 57 in the valve body 56 by the imposition of a force on its end 78 opposite the closure plate 72. Upon imposition of this force, the spring 76 is compressed by movement of the valve stem 70, and the closure plate 72 is moved away from the valve seat 64 thus opening the valve to the flow of air through the through opening 57 the valve body 56 to inflate the bladder 62. (See FIG. 3). Upon release of the force on the end 78 of the valve stem 70, the spring 76 expands causing the valve to close. (See FIG. 2).

Figure 3:
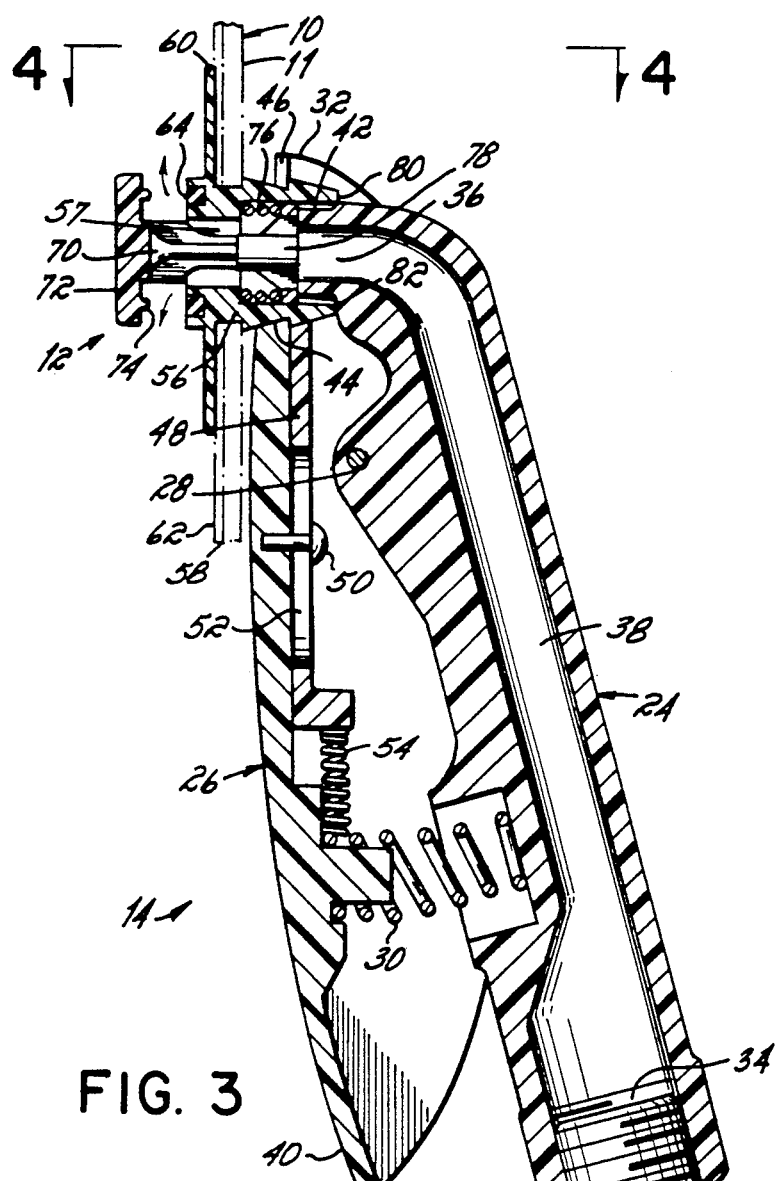
FIG. 3 is a cross-section of the air inflation nozzle and air bag valve shown in FIG. 2 with the air inflation nozzle engaging the air bag valve and the air bag valve being in the valve open position.

Referring now in detail to FIG. 3, in use, the operator grasps the inflation nozzle 14 in the palm of his hand with his fingers extending around the rearward end of the handle 26. The body 24 rests in the palm of his hand. Upon squeezing of the handle 26 by the operator's fingers, the handle 26 pivots around the pivot pin 28 retracting the forward end 32 of the handle 26 and the closure 48 from the nozzle tip 42. The nozzle 14 is then slid sideways onto the valve body 56 with the valve body 56 entering the recess 44 at the forward end 32 and the side guides 46 sliding beneath the edge 68 of the valve body 56. Engagement of the valve body 56 with the closure 48 on this sliding engagement causes compression of the spring 54 and the automatic retraction of the closure 48 in the handle 26. As the sliding movement continues, the valve body 56 slides fully into the handle recess 44. The handle is squeezed sufficiently to permit the nozzle tip 42 to clear the end 80 of the valve body 56 with the handle side guides 46 underlying edge 68.

Upon release of the operator's hand pressure, spring 30 causes pivotal movement of the main body 24 toward the handle 26. Since the handle is constrained by edge 68, the nozzle tip 42 is caused to protrude into the air valve body 56. The nozzle tip 42 in turn contacts the end 78 of the valve stem 70 compressing the air valve spring 76 and opening the valve 12. The pressure of the spring 30 of the inflation nozzle 14 firmly and positively clamps the nozzle 14 on the air valve body 56 with the nozzle tip 42 in through opening 57. The nozzle tip 42 includes an annular sealing surface 82 which mates with the end 80 of the air valve 12 to seal the nozzle tip 42 in the air valve body 56 permitting inflation of the bladder 62. The operator then depresses the lever 20 of the on/off valve 18 inflating the bladder and reads the air gauge 22 shutting off the air at the desired inflation pressure.

When the air bag 10 is inflated to its desired pressure, the operator then grasps nozzle 14 in his hand rearward of the pivot 28 and again squeezes the handle 26. This compresses the spring 30 and retracts the nozzle tip 42 out of its seating engagement in the air valve body 56. Upon release of the force of the nozzle tip 42 on the end 78 of the air valve stem 70, the spring 76 in the air valve body 56 causes retraction of the valve stem 70, seating of the annular ridge 74 on valve seat 64, and closing of the air valve 12 sealing the compressed air in the bladder 62. Squeezing is continued until the nozzle tip 42 clears the end 80 of the valve body 56. The operator then slides the inflation nozzle 14 sideways out of engagement with the air valve body 56. In doing so, the spring 54 causes the closure 48 to slide forwardly over the recess 44 in the handle 26.

Once the inflation nozzle 14 is removed from the air valve 12, the operator releases his hand pressure and spring 30 pivots the handle and body together causing the nozzle tip 42 to seat against the closure 48 thereby cutting off any accidental flow of compressed air through the nozzle tip outlet 36 when the inflation nozzle 14 is removed from the air valve 12.

The air inflation nozzle 14 may be made of any suitable material including both metal and plastic. One presently preferred material is 77 durometer (D-scale) urethane plastic. In addition, it will be appreciated that a number of other forms of air inflation valves may be used with the inflation nozzle of the present invention, including valves operating with a needle and seat valve arrangement and a ball and seat valve arrangement.

Thus having described the invention, what is claimed is:

1. A inflation nozzle for inflating an article through a valve with a gas under pressure, said valve including a tubular valve body having a through opening communicating between the interior of said article and the exterior of said article, a valve closure member mounted in said through opening and being movable between a valve open and a valve closed position, said closure member being normally biased to the valve closed position, and an engagement member located on said valve body exterior of said article, said inflation nozzle comprising:
   a main body portion having a gas inlet end, a gas outlet end, and a gas flow passageway therebetween,
   a handle pivotally mounted on said main body portion,
   said main body portion having a tubular nozzle tip at said gas outlet end of a size to protrude into said through opening of said valve and to engage said valve closure member to move said member from said normally valve closed position to said valve open position to permit inflation of said article,
   engagement means for engaging said engagement member of said valve body to hold said valve and inflation nozzle together during inflation of said article, including means biasing said main body portion and said handle together at said nozzle tip to effectively clamp said inflation nozzle to said valve body and a seating surface for operatively sealing said nozzle tip in said valve body through opening to cause inflation of said article by the gas under pressure flowing through said main body portion and through said valve, and
   closure means for sealing said gas outlet end of said main body portion when said inflation nozzle is out of engagement with said valve.

2. An inflation nozzle for reinflating a cargo air bag through a valve with a gas under pressure, said valve including a tubular valve body having a through opening communicating between the interior of a bladder in said air bag and the exterior of said air bag, a valve closure member mounted in said through opening and being movable between a valve open and a valve close position, said closure member being normally biased to the valve closed position, and an engagement member located on said valve body exterior of said article, said inflation nozzle comprising:
   a main body portion having a gas inlet end, a gas outlet end, and a gas flow passageway therebetween,
   a handle pivotally mounted on said main body portion,
   said main body portion and said handle being of an extended length between said pivotal mounting of said main body portion and said handle portion and said gas inlet end of said main body portion whereby said main body portion and said handle may be grasped in the hand of an operator,
   spring means for pivoting said main body portion and said handle about said pivotal mounting,
   said main body portion having a tubular nozzle tip at said gas outlet end of a size to protrude into said through opening of said valve and to engage said valve closure member to move said member from said normally valve closed position to said valve open position to permit inflation of said cargo air bag,
   said handle including a recess at the end thereof opposite said tubular nozzle tip, said recess being of a size to receive therein said tubular valve body exterior of said cargo air bag,
   said handle further including a pair of side guides operative to engage said engagement member located on said valve body whereby said side guides can be slid sideways under said engagement member with said spring in the compressed condition and whereby upon release of said spring said tubular nozzle tip is caused to protrude into said through opening, engage said valve closure member and move said member to a valve open position as said main body portion and said handle pivot with respect to one another to effectively clamp said inflation nozzle to said valve body,
   said nozzle tip including a sealing surface for sealing said nozzle tip in said valve body through opening to cause inflation of said air bag by the gas under pressure flowing through said main body portion and through said valve, and
   a closure member slidably mounted in said handle and spring loaded to a position wherein said closure member covers said recess in said handle to seal said gas outlet end of said main body portion when said inflation nozzle is out of engagement with said valve.

3. The inflation nozzle of claim 2 wherein said engagement member located on said valve body exterior of said cargo air bag is an annular edge intermediate the exterior end of said valve body and the exterior wall of said cargo air bag.

4. The inflation nozzle of claim 2 wherein said tubular valve body has a section intermediate said engagement member and the exterior wall of said cargo air bag operative to engage said closure member to cause retraction of said closure member and opening of said nozzle tip for reception in said through opening of said tubular valve body.

5. The inflation nozzle of claim 2 wherein said closure member is mounted to said handle by a pin and slot connection and further comprising a spring for biasing said closure member to its position over said recess in said handle.

6. The inflation nozzle of claim 2 wherein said nozzle tip is recessed in said handle.

7. The inflation nozzle of claim 2 wherein said nozzle tip sealing means comprises an annular seating surface spaced from said gas outlet end operative to engage the external end of said tubular valve body to seal said nozzle tip therein.

* * * * *